Jan. 1, 1957   H. A. GEERDS   2,776,148
TWO STATION LANDING GEAR FOR SEMI-TRAILERS
Filed Oct. 28, 1954   2 Sheets-Sheet 1
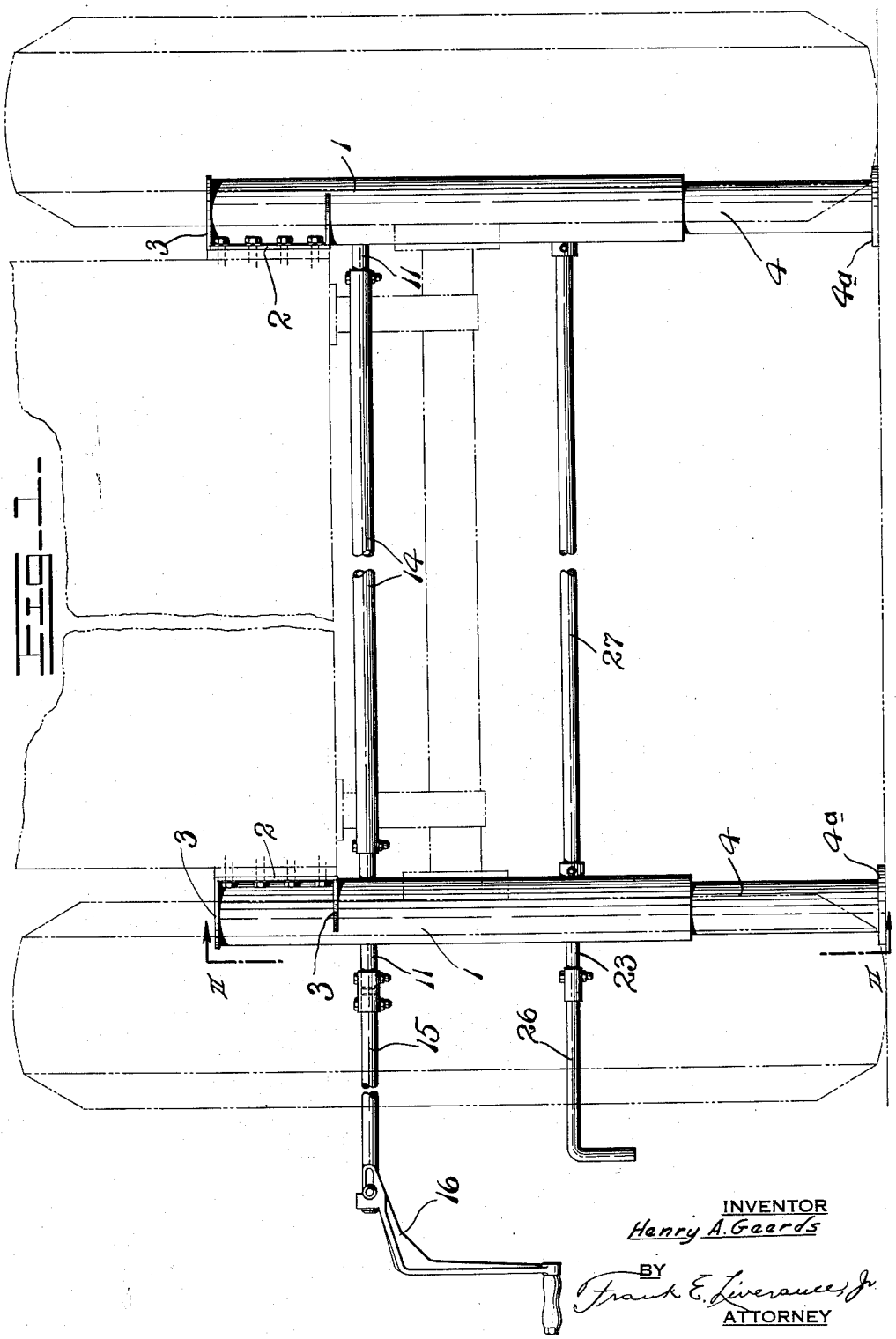
INVENTOR
Henry A. Geerds
BY
Frank E. Liverance Jr.
ATTORNEY

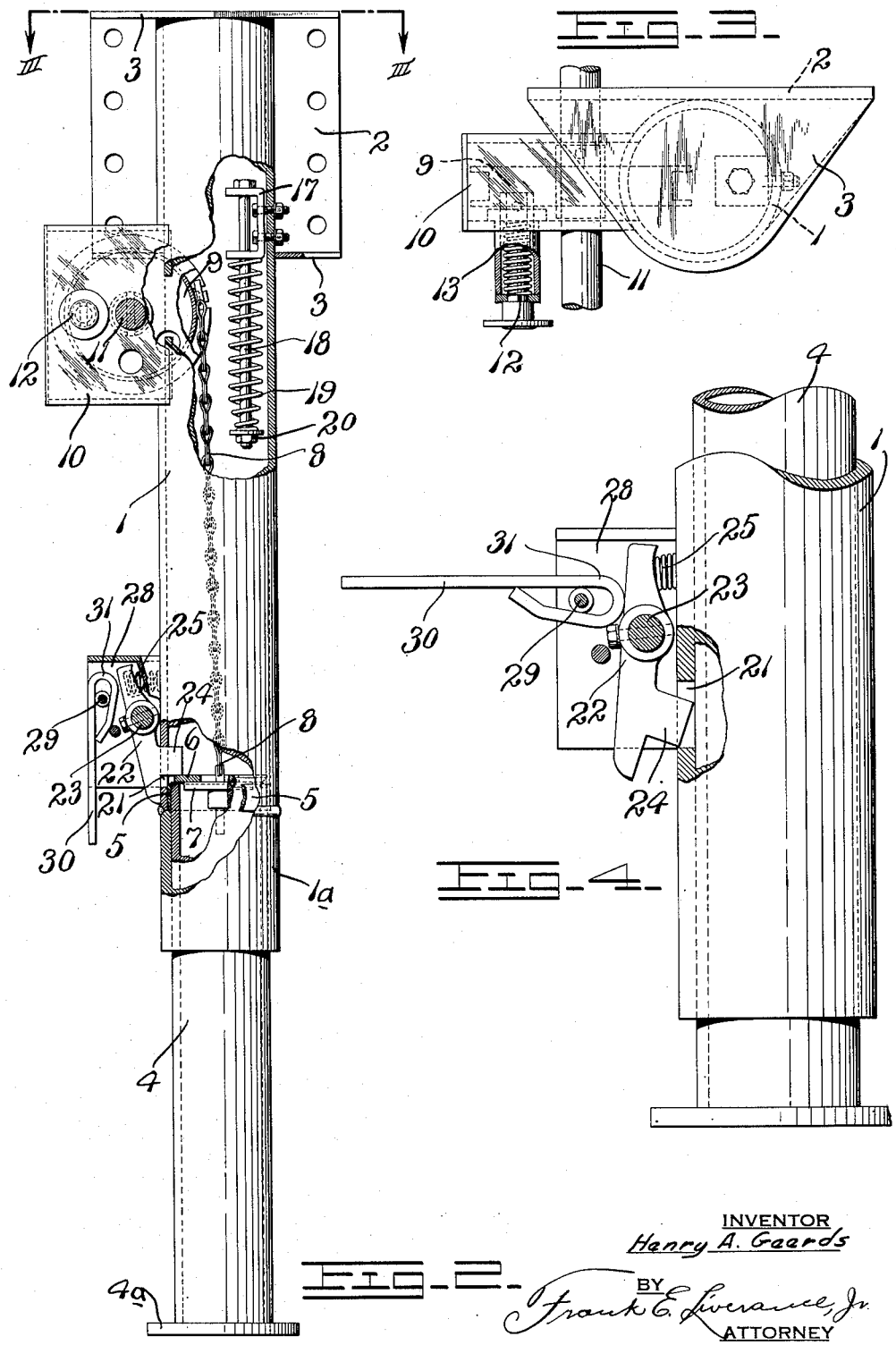

United States Patent Office 2,776,148
Patented Jan. 1, 1957

2,776,148

TWO STATION LANDING GEAR FOR SEMI-TRAILERS

Henry A. Geerds, Holland, Mich., assignor to Holland Hitch Company, Holland, Mich., a corporation of Michigan Application October 28, 1954, Serial No. 465,258

3 Claims. (Cl. 280—150.5)

This invention relates to a landing gear for trailers which in practice are pulled behind trucks. The trailer at its rear portion is supported by wheels which run over the ground. When the trailer is being drawn over the road it is detachably connected with a pulling truck or tractor usually by a well known type of fifth wheel construction. When a trailer has reached its destination and the truck disconnected, it is necessary to support its front end at the proper level. My invention is directed to a quick acting construction of landing gear in which vertically telescoping lower parts of vertical strut supports for the trailer, one at each side thereof, are quickly lowered and automatically locked in position on reaching their lower positions and also are very quickly elevated, one turn only of an operating crank lifting such lower telescoping parts to an upper position so that they will be above the road and not striking thereagainst when the trailer is being moved over the road.

Heretofore in general the crank operated or power landing gears using helical screw means for elevating the road engaging parts require several turns of the manually operated crank which is used. In other structures the supporting struts are manually raised or lowered individually at each side of the trailer. My invention provides control of both of said struts or legs automatically, with a very speedy retention and retraction mechanism being used.

An understanding of the invention may be had from the following description taken in connection with the accompanying drawings, in which, Fig. 1 is an elevation of the landing gear in its extended operative position.

Fig. 2 is a side elevation thereof with parts broken away and shown in section, the plane from which the view is taken being that indicated by the line II—II of Fig. 1, looking in the direction indicated.

Fig. 3 is a plan view of one of the struts looking downwardly from the plane of line III—III of Fig. 2, and Fig. 4 is a somewhat enlarged fragmentary lower end elevation of one of the legs or struts in the retracted position.

Like reference characters refer to like parts in the different figures of the drawings.

In the construction which is used to embody my invention, an elongated tubular member 1 at its upper end has a bracket structure welded or otherwise permanently secured thereto including an inner side vertical plate 2 and horizontal upper and lower plates 3 of the form shown in Figs. 1 and 3, the plate 2 being bolted to the trailer body which is shown in dash and dot lines in Fig. 1. One of such members 1 is at each side of the trailer. The retractable and extensible telescoping member used with each of the members 1 is a tubular member 4 which is inserted in the lower end portion 1a of the member 1 and may be raised or lowered therein. Such member 4 has foot member 4a at its lower end. At its upper end a collar 5 surrounds it and is permanently secured which, in the extended position as in Fig. 2, comes against the annular shoulder at the upper end of a lower addition 1a of the upper tubular member 1. The addition or extension 1a to the tubular member 1 is welded thereto. It has a lesser inner diameter than the member 1 thereby providing the mentioned shoulder. The etxension members 4 accordingly at lowermost positions have the collars 5 engaging shoulders on the parts 1a.

The upper end of each of the extension members 4 is covered by a plate 6 secured thereto underneath which is a member 7. A chain 8 is attached at its lower end to said member, extends upwardly through the upper tubular member 1 and reaches to and is secured at its upper end to a drum 9. Each drum 9 is mounted on a horizontal transverse shaft 11 which extends through a housing 10 for the drum connected by welding or other suitable permanent connection at the side of each tubular member 1. Such drum is engaged by a spring actuated locking plunger 12 slidably mounted in and extending lengthwise of a tubular housing 13 therefor secured to a side of the housing or casing 10, its inner end being normally pressed against a side of the drum 9 so as to enter openings therefor of a size to receive the inner end of the locking plunger 12.

The two shafts 11 mounted on housings 10 carried by the two upper tubular members 1 are horizontally aligned and connected together by a bridging shaft 14 between them (Fig. 1). At the outer end of one of the shafts 11, as shown in Fig. 1, an aligned shaft 15 is permanently secured at the outer end of which is a crank 16 for manual operation. Thus both of the shafts 11 and drums 9 may be simultaneously manually operated for the winding or unwinding of the chains 8 causing a simultaneous lifting or lowering of the extension members 4.

Within each of the tubular members 1, adjacent the drums 9, a bracket 17 (Fig. 2) is permanently secured. A rod 18 having a head at its upper end extends downwardly through the legs of said bracket and below the lowermost leg. The lower portion of such rod 18 is surrounded by a coiled compression spring 19 between the lower side of each bracket 17 and a nut secured washer 20 adjacent the lower end of the rod 18. On lifting the extensions 4 to uppermost position the lower ends of the rods 18 are engaged and pressed against and moved a short distance, compressing the springs 19 before a drum is locked by its locking plunger 12.

Adjacent the lower end of each of the upper tubular leg members 1 an opening 21 is made. A locking dog 22 is fixed on a short shaft 23 at its lower end having a locking projection 24 adapted to pass through the opening 21 and at its upper end actuated by spring 25 to normally turn the locking dog at its lower end inwardly. A manually operable crank handle 26 is secured at the outer end of the shaft 23 which is directly below the shaft 11 with which the crank 16 is operatively secured and the two shafts 23 are connected by a shaft 27 located below and parallel to the shaft 14. Mountings for the shafts on the members 1 are provided by housings 28 located below and at the same sides of the members 1 as the upper housings 10.

When the extension members 4 are at lowermost position, as in Fig. 2, the plates 6 at the upper ends of said members 4 are at a lower position such that the projections 24 passing through the openings 21 extend over such plates. The members 4 are locked in lower position against upward return and support the trailer and hold it in its upper position. By turning the crank 26 both locking dogs 22 are retracted outwardly, as in Fig. 4, releasing the extension members 4 which may then be lifted by operating the crank 16.

On the housing 28 adjacent the crank 26 a cross pin or short shaft 29 is mounted for rotation to which a dog holding lever 30 is permanently secured. Such member 30 is looped back upon itself as at 31 above and below the shaft 29. When in its vertical position as in Fig. 2 the dog 22 with which it is associated is free for movement. But when turned to horizontal position the dog 22 is held against inward movement at its lower end, the projection 24 on each of the dogs used being withdrawn so as not to interpose in the path of movement of the upper ends of the extension leg or strut members 4. Because of the connection between the shafts 23 made by the shaft 27 the locking dogs 22 are simultaneously operated. There will be one only of the dog holding members 30, at the side of the trailer where the operator operates the cranks 16 and 26 and one only of the locking plungers 12 at the same side so that all of the operations involved in the structure which I have designed are done by the driver of the truck without necessity of moving from one side of the truck and trailer to the other.

With the parts in upper position as in Fig. 4, to drop the extension members 4 the crank handle 16 is grasped and rotated in a direction to counteract the compression springs 19. The locking stud 12 which is engaged with the drum 9 nearest to the crank 16 is first pulled out. The crank is then allowed to rotate under gravity supplied by the weight of members 4 and upon one rotation of the crank handle the members 4 will be fully extended. With the dogs 22 free to move, upon reaching lowermost fully extended position such dogs 22 will pass through the openings 21 above the plate 6 and the lower extensions 4 will be held against return movement.

To retract or raise the extension members the crank 26 is pulled upon to withdraw the locking projections 24 and is held until the crank 16 has been operated sufficiently to retract such members 4 and lift the collars 5 above the projections 24 of the locking dogs. A full rotation of the shafts 11 and drums 9 is continued until the locking stud 12 enters its opening in the drum 9. More than one opening may be made in the drum 9 and the locking dog 12 will enter the opening first reached; and if the parts 4 are to be lifted higher the dog is withdrawn and the rotation continued to further lift the extension members 4 until the selected opening in the drum 9 is reached, that is, the drum which is nearest the side of the trailer at which the operator is positioned.

With the construction described operation is speeded up and is also simplified. Both legs or struts which carry the trailer are automatically locked at either their extended or retracted positions. The manually operated locking dog retaining member 30 is easily accessible and may be turned to the position shown in Fig. 4 to hold the projections 24 away from the extension members 4 and out of the path of movement of the collar 5 on downward extension being released when the lower extension has been completed.

The structure described is speedy in operation. It has a maximum strength per pound of metal used and the cost is therefore reduced because less metal is required. It is further reduced because of the quality of metal required not being as expensive as in the helical screw operated mechanisms. The extension chains or cables 8 are connected to the plates 7 for adjustment to compensate for stretch or wear and swivel connections at such plate 7 are used to safeguard against damage or rupture should there be, for some reason, a twisting or turning of the extension members 4 in their telescoping movements lengthwise of the upper members 1.

The invention is defined in the appended claims and is to be considered comprehensive of all forms of structure coming within their scope.

I claim:

1. Landing gear for trailers comprising, two spaced, parallel, outer tubular members adapted to be secured to and depend from a trailer body, a tubular extension member telescopically entering into each of the first members at the lower end thereof, stops at the lower end portions of the outer tubular members engaging cooperating stops at the upper ends of the second tubular members to limit downward movements of said second tubular members, a latch lever carried at a side of each of said outer tubular members having a projection extending through the adjacent side of said outer tubular members over the upper end of its associated second tubular member when extended, manually operable means connected with both latch levers for simultaneously releasing said levers, cables secured one to the upper end of each of said second tubular members extending upwardly within the first tubular members, a winding drum for each cable to which said cables are secured at their upper ends, manually operable means for turning both drums to lift said second tubular members, and releasable latching means for holding the second tubular members in lifted position.

2. Landing gear for trailers comprising, two spaced, parallel, hollow, generally vertical tubular members adapted to be secured at their upper ends to and extend downwardly from a trailer body, a generally vertical member telescopically received into each of said first members at the lower ends thereof, stops limiting the downward movements of said second members, spring actuated latches automatically extending across the upper ends of said second members when said second members are in lowermost positions, means for simultaneously releasing said latches, a cable secured to the upper end of each of said second members extending upwardly through the first members, means for manually winding said cables simultaneously to lift said second members, means for releasably securing said winding means with said second members in upper position, and spring members against which the upper ends of said second members engage and compress said springs upon lifting said second members to upper, releasably secured positions.

3. Landing gear for trailers comprising, two two-part telescoping extension legs adapted to be secured at their upper ends to and depend from a trailer body in spaced relation to each other, each having a lower vertically extensible and retractable member telescoping upwardly into an aligned upper member, means extending over the upper ends of said lower members, said means bearing against the sides of said lower members when said lower members are above lowermost position, means for releasably locking said members in lower position, means for releasably holding said members in upper position, manually operable means for simultaneously lifting said members and for gravity lowering thereof, and yielding means within said upper members against which lower members compressibly engage when lifted to upper position.

References Cited in the file of this patent
UNITED STATES PATENTS

| 1,566,803 | Morris | Dec. 22, 1925 |
| 1,599,421 | Klesa | Sept. 14, 1926 |
| 1,923,255 | Chambers | Aug. 22, 1933 |
| 2,374,320 | Barnhart et al. | Apr. 24, 1945 |
| 2,471,555 | Bennett | May 31, 1949 |